Figure 1:
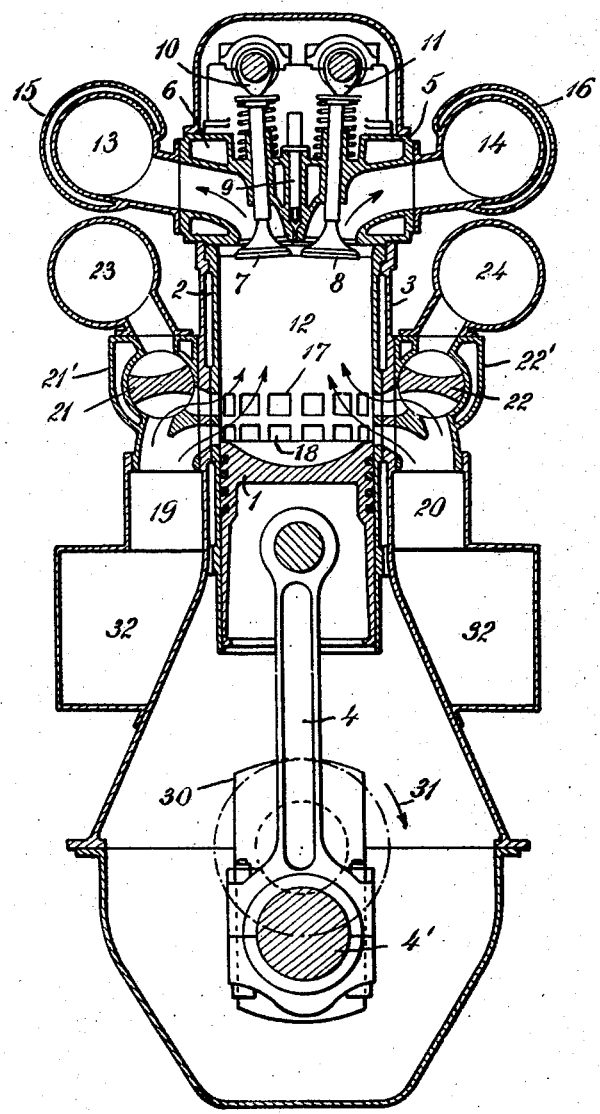

June 9, 1936.  E. LUCHSINGER  2,043,296
INTERNAL COMBUSTION ENGINE SCAVENGING SYSTEM
Filed May 16, 1934   2 Sheets-Sheet 2
Fig. 2.  Fig. 3.  Fig. 4.
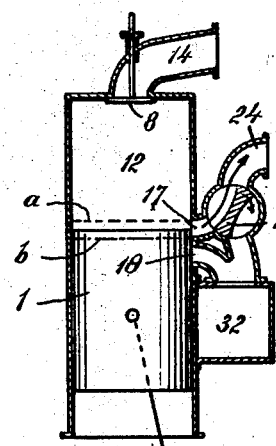
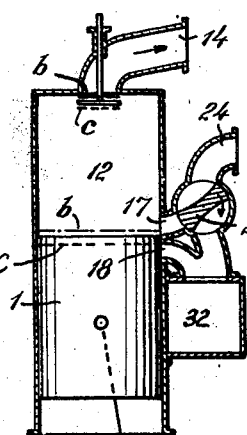
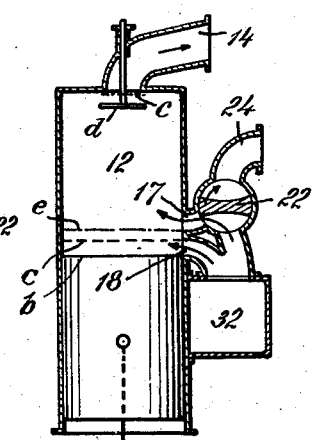
Fig. 5.
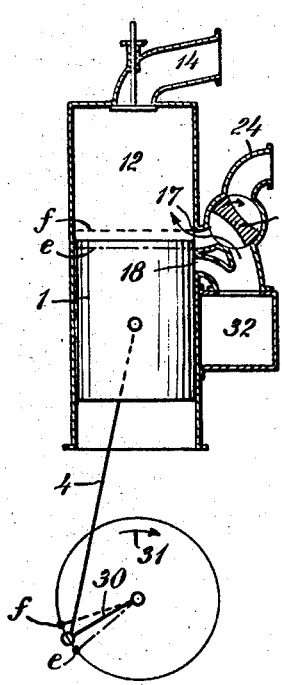
Fig. 6.
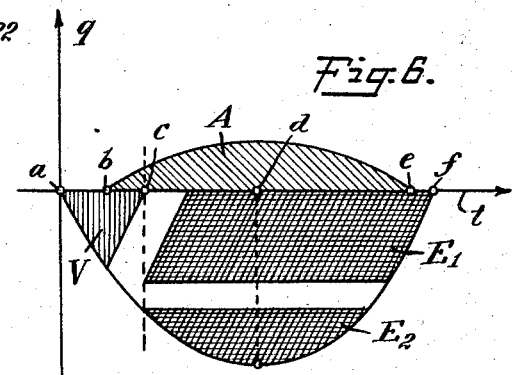
INVENTOR:
Emil Luchsinger;
BY:
HIS ATTORNEYS.

Patented June 9, 1936

2,043,296

UNITED STATES PATENT OFFICE 2,043,296

INTERNAL COMBUSTION ENGINE SCAVENGING SYSTEM

Emil Luchsinger, Steinegg, Wiesendangen, Switzerland, assignor to Sulzer Frères Société Anonyme, Winterthur, Switzerland Application May 16, 1934, Serial No. 725,843
In Germany and Switzerland May 23, 1933

5 Claims. (Cl. 123—65)

This invention relates to fuel-oil internal combustion engines; particularly, two-stroke cycle engines, either with Diesel injection or mechanical injection.

Such engines, when embodying straight-through, or unidirectional flow scavenging systems, exhibit not only the disadvantage that the exhaust valves are continually exposed to the extremest of high temperatures, with obvious results, but what is even more serious, the outlet cross-sections available, have to be disadvantageously small because of the power requirements of the engine. Another disadvantage of such engines is that they are faulty in operation at high speeds.

It is the general object of this invention to overcome these drawbacks and provide a two-cycle engine which will have uniflow scavenging, yet have large outlet cross-sections and not expose the exhaust valves to dangerously high temperatures or develop other faults at high speed operation.

Other objects and advantages will become evident as the required disclosure of a working embodiment, hereinafter following, is considered.

That embodiment of the invention which is at present the preferred one has been chosen for description in conjunction with the accompanying drawings. These drawings show the embodiment of the invention by way of illustration, and not of limitation, of the invention, which extends to all forms within the scope of the subjoined claims. In these drawings, Fig. 1 is a typical vertical cross-section of the engine, partly in elevation, and somewhat diagrammatic;

Figs. 2–5 are diagrammatic views of operational positions of the engine, consolidating some of the duplicate parts of Fig. 1 and omitting others, for the sake of clarity, and Fig. 6 is a graph of certain performance characteristics of the engine.

Referring more particularly to the drawings, and especially to Fig. 1, a piston 1 reciprocates in a cylinder 2, enclosed in a cooling jacket 3, and transmits combustion forces by means of a connecting rod 4, to a crankshaft, 4'. A cylinder cover-unit 5 is provided and has lightening and cooling spaces, 6. This unit also carries an exhaust-unit consisting of exhaust valves 7 and 8 and their associated overhead-cam mechanism 10 and 11; as well as a fuel-injecting mechanism 9, which may be either of the solid, airless, or mechanical injection type; or of the air,—or Diesel,—type.

The cam shafts are driven in the conventional manner and operate the valves 7 and 8 in the normal way, and at the end of the expansion, or working, stroke, they connect working-chamber 12 with exhaust-conduits, 13 and 14. These conduits are each provided with, and enclosed in, cooling jackets 15 and 16.

In the lower dead center zone are provided ports, slots or other apertures arranged with a vertical relationship such that they are, in groups, successively uncovered by the descending piston. In the form shown, they comprise two vertically spaced rows of ports, an upper row 17 and a lower, 18. Both rows of ports are adapted, by means of channels 19 and 20, to be placed in communication with a supply of fresh, or outside, compressed air comprising tank 32. Valve-blocks 22' and 21' are provided encircling the zone of the ports and carry rotary valves such as 22 and 21, preferably rotating at N½ times the engine speed where N is any whole number whatsoever, and controlled by any suitable means, in the manner hereinafter described. The row 17 can also be connected, by valve members 21 and 22, with exhaust conduits 23 and 24. Preferably both rows extend around the entire periphery of the cylinder. The exhaust gases can very satisfactorily leave the cylinder through conduits 23 and 24 by virtue of their inherent pressure-difference. They are, however, removed through valves 7 and 8 in a positive manner, in the second phase of the scavenging process, by means of any well-known vacuum-producing device, not shown, but associated with conduits 13 and 14. As, however, the gases escaping through conduits 13 and 14, in the second phase, are cooled by jackets 15 and 16, the vacuum-creating means can be made of small size.

In operation, with the crank 30 and the piston 1, in the relative positions shown in Fig. 2, the control valve 22 establishes communication between the working-chamber 12 and exhaust conduit 24, the valves 7 and 8 being, at that juncture closed. This occurs just as, or just before, the piston and crank, in position a, uncover ports 17. The gases of combustion therefore are first removed from the engine through ports 17, valve 22 and exhaust conduit 24.

These ports 17 are, however, soon closed to the conduit 24, being closed by valve 22 while the crank rotates from position b towards position c, as shown in Fig. 3. At position b the exhaust valves 7 and 8 begin to open so that the next step in disposing of the spent gases is to remove them through the cooled scavenging discharge 14.

Upon equalization of pressure occurring in the cylinder, air is positively injected into the cylinder through ports 18 by way of channels 19 and 20, from compressed-air tank 32, to which air is delivered by an air compressor (not shown). This occurs from point c (Fig. 4) onward. After further rotation of the valve 22, air is also fed through ports 17. By this step, the cylinder is thoroughly and positively scavenged of spent, burnt, dead, or lean gases, and instead is completely filled with fresh air to be compressed for the next combustion. The exhaust valves 7 and 8 close at point e (Fig. 5) and, the cylinder is still being charged up to the point f (Fig. 5) with fresh air, through valve 22 and ports 17. Hence before compression by piston 1 commences, the cylinder is charged with air at a pressure above that of the atmosphere, or, in other words, the cylinder is supercharged.

Then, when the piston arrives in the vicinity of the upper dead center, fuel is injected, in the well-known manner, into the compressed fresh air, beginning a new working-cycle with a combustion and expansion stroke.

This method of operation is graphed in Fig. 6, where a time-vector $t$, has the cross-sections, $q$, uncovered by the exhaust-valve 8, on its upper side; and the cross-sections $z$, uncovered by ports 17 and 18, arranged on its lower side. A represents the time-cross section for exhaust through valve 8, area V the same for exhaust through ports 17, and the areas $E_1$ and $E_2$ the time-cross section for admission through ports 17 or 18. From this figure, it is clear that the outlet cross-sections are of unusually large size, and that the exhaust valves are exposed to high temperatures for only very short times. The engine will thus not be subject to these forces, and will operate well at high speeds.

I claim:

1. The method of scavenging a two-stroke cycle internal combustion engine by uni-directional flow which comprises permitting the combustion gases to discharge under their own pressure through an opening adjacent one dead center end of the engine cylinder, introducing scavenging air under positive pressure at said dead center end of the cylinder and causing products of combustion to be discharged at the opposite dead center end of said cylinder under the action of said scavenging air, and interrupting until the next cycle the discharge of combustion gases adjacent said first mentioned dead center end of the engine cylinder substantially at the commencement of the introduction of said scavenging air.

2. In a two-stroke cycle internal combustion engine having a cylinder and a piston reciprocating therein, exhaust and air admission ports in the cylinder walls near one dead center position of said piston said exhaust port being uncovered by said piston before the uncovering of said air admission port, an exhaust conduit connected with said exhaust port, means for supplying air under pressure to said air admission port, a scavenging discharge valve near the opposite dead center end of said cylinder adapted to remain open while said air admission port is uncovered by said piston, and valve means independent of said piston for closing said exhaust conduit in timed relation to the uncovering of said air admission port so as to cause the air admitted through said air admission port to traverse the cylinder from end to end and force products of combustion remaining in the cylinder after the closing of said independent valve means to be discharged from the cylinder through said scavenging discharge valve.

3. In a two-stroke cycle internal combustion engine having a cylinder and a piston reciprocating therein, exhaust and air admission ports in the cylinder walls near one dead center position of said piston said exhaust port being uncovered by said piston before the uncovering of said air admission port, an exhaust conduit connected with said exhaust port, means for supplying air under pressure to said air admission port, a scavenging discharge valve near the opposite dead center end of said cylinder adapted to remain open while said air admission port is uncovered by said piston, and valve means independent of said piston for closing said exhaust conduit prior to the uncovering of said air admission port so as to cause the air admitted through said air admission port to traverse the cylinder from end to end and force products of combustion remaining in the cylinder after the closing of said independent valve means to be discharged from the cylinder through said scavenging discharge valve.

4. In a two-stroke cycle internal combustion engine having a cylinder and a piston reciprocating therein, exhaust and air admission ports in the cylinder walls near one dead center position of said piston, said exhaust port being uncovered by said piston before the uncovering of said air admission port, an exhaust conduit connected with said exhaust port, means for supplying air under pressure to said air admission port, a scavenging discharge valve near the opposite dead center end of said cylinder adapted to remain open while said air admission port is uncovered by said piston, and valve means independent of said piston for closing said exhaust conduit in timed relation to the uncovering of said air admission port and for connecting said exhaust port with a source of air under pressure.

5. A two stroke cycle internal combustion engine in which the exhaust takes place in two phases, said engine having a cylinder and a piston reciprocating therein, piston-controlled exhaust and air admission ports in the cylinder walls near one dead center end of the cylinder, said exhaust port being uncovered by the piston before the uncovering of the air admission ports and permitting the first phase of the exhaust to take place, an exhaust conduit connected with said exhaust port, means for supplying air under pressure to the air admission port, a scavenging discharge valve for the second phase of the exhaust near the opposite dead center end of the cylinder and controlled independently of the piston, and valve means controlled independently of the piston for closing said exhaust conduit at the latest after air commences to flow through the air admission port and for connecting said exhaust port with said air supply whereby air is admitted to the cylinder simultaneously through said exhaust port and said air admission port for completing the second phase of the exhaust and scavenging the cylinder.

EMIL LUCHSINGER.